June 15, 1954  W. J. METZGER  2,681,157
COUPLER SHANK AND YOKE CONNECTION
Filed Nov. 30, 1950  3 Sheets-Sheet 1

INVENTOR.
WILLIAM J. METZGER
BY Henry Kozak
ATTORNEY

June 15, 1954     W. J. METZGER     2,681,157
COUPLER SHANK AND YOKE CONNECTION

Filed Nov. 30, 1950     3 Sheets-Sheet 2

INVENTOR.
WILLIAM J. METZGER
BY *Henry Kozak*
ATTORNEY

June 15, 1954    W. J. METZGER    2,681,157
COUPLER SHANK AND YOKE CONNECTION
Filed Nov. 30, 1950    3 Sheets-Sheet 3

INVENTOR.
WILLIAM J. METZGER
BY Henry Kozak
ATTORNEY

Patented June 15, 1954

2,681,157

UNITED STATES PATENT OFFICE 2,681,157

COUPLER SHANK AND YOKE CONNECTION

William J. Metzger, East Cleveland, Ohio, assignor to National Malleable and Steel Castings Company, Cleveland, Ohio, a corporation of Ohio Application November 30, 1950, Serial No. 198,417

3 Claims. (Cl. 213—69)

This invention relates to coupler shank and yoke connections for use particularly on railway vehicles.

The usual car coupler is connected to a draft gear yoke or similar member by means of a key or pin. Accidental disconnection of the coupler from the yoke due to dislodgment or breakage of the connecting key has occurred quite frequently in service and has been the cause of many train partings due to coupler pull-outs. Also, many derailments have been caused by the pulled out coupler and associated parts dropping onto the track. Various forms of locking devices have been used for preventing dislodgment of the connecting key but these have not entirely eliminated coupler pull-outs.

Accordingly, an object of the invention is to provide a coupler shank and yoke connection which omits the use of a conventional key or pin for connecting the parts.

A more specific object is to provide a coupler shank and yoke connection in which retainer blocks are used, the blocks being so arranged as to be anchored to the coupler shank for movement therewith in buff and in draft and to be slidable transversely relative to the shank.

An important aspect of the invention resides in the interchangeability of the coupler shank and of the yoke with that of the A. A. R. (Association of American Railroads) standard E coupler rigid shank and of the A. A. R. standard vertical plane yoke, known as the Y-40. Thus the coupler shank as described herein may be substituted for the A. A. R. standard E coupler rigid shank and be connected to the Y-40 standard yoke by the conventional horizontal key. Likewise, the yoke as described herein may be substituted for the Y-40 standard yoke and connected to the A. A. R. standard E coupler rigid shank. In either case, all of the A. A. R. dimensional and strength requirements are met by the substituted parts.

It is therefore a further object to provide a keyless coupler shank and yoke connection whereby the shank or yoke may be universally used in combination with the existing A. A. R. standard E coupler rigid shank and with the A. A. R. standard vertical plane yoke.

Other objects and advantages of my invention will be apparent from the following description taken in conjunction with the drawings in which.

Figure 8:
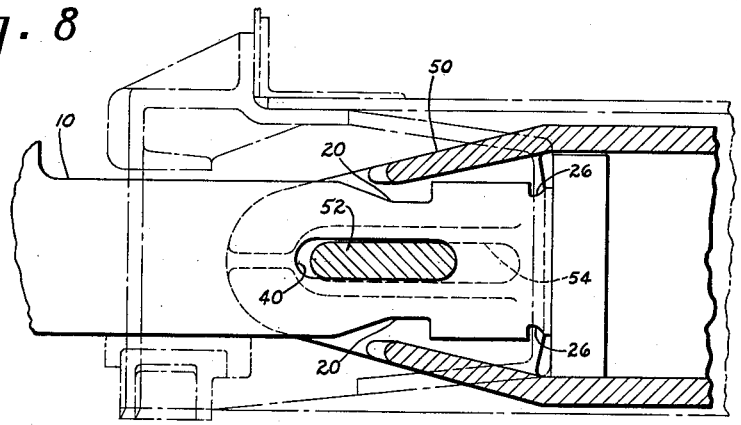

Fig. 8 is a longitudinal vertical sectional view showing a coupler shank embodying my invention applied to an A. A. R. standard vertical plane yoke and connected thereto by the conventional horizontal key.

Figure 9:
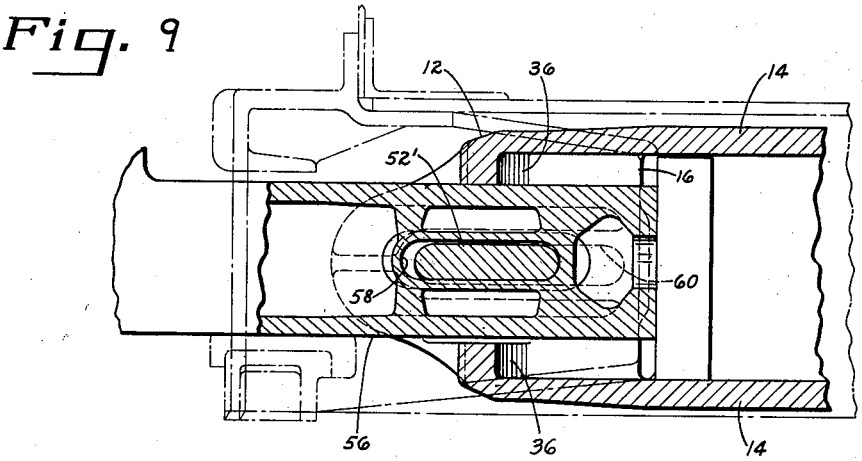

Fig. 9 is a longitudinal vertical sectional view showing a yoke embodying my invention to which has been connected an A. A. R. standard E coupler rigid shank by means of the conventional horizontal key.

Referring particularly to Figs. 1 to 4 of the drawings the numeral 10 designates the coupler shank and 12 the yoke. The yoke comprises top and bottom straps 14 and has a hooded forward end formed by the straps and by side walls 16. The coupler shank, which is preferably rectangular in section, comprises top and bottom walls 15 and side walls 17. The shank extends into the hooded portion of the yoke and is operatively connected thereto by a pair of retainer blocks 18 which are interposed between the shank and the yoke straps. The shank top and bottom walls 15 are recessed or grooved as at 20 to form forward shoulders 22 which extend transversely the width of the shank. Blocks 18 are provided at their forward ends with transverse projections 24 which extend into recesses 20 and engage shoulders 22 on the shank to prevent rearward movement of the blocks relative to the shank. At the end of the shank walls 15 are provided with transverse recesses 26 for receiving projections 28 on the blocks. Shoulders 30 are provided in recesses 26 for engagement with projections 28 to prevent forward movement of the blocks relative to the shank. Thus blocks 18 are recessed into the top and bottom of the shank and are thereby anchored thereto for movement with the shank in both forward and rearward directions. It will be apparent, however, that except as restricted by side walls 16 of the yoke, blocks 18 are movable transversely of the yoke for the purpose to be hereinafter described. Also, it will be observed that the engagement between shoulders 22 and 30, and projections 24 and 28 assures that blocks 18 will move with shank during horizontal angling of the latter relative to the yoke.

Movement of blocks 18 and shank 10 forwardly of the yoke is limited by stops 32 which engage the forward surfaces 34 of the blocks. Thus in draft the yoke is pulled forward by the coupler shank, while in buff the shank and blocks move rearward relative to the yoke. Surfaces 34 on the blocks are arcuate and the engaging surfaces 36 on the yoke are correspondingly curved to assure full bearing between these surfaces during horizontal angling of the coupler shank relative to the yoke within the clearances provided between the shank and the yoke side walls 16. It will be observed that the end surface 38 on the coupler shank is disposed rearwardly of the ends of blocks 18 so that in buff only surface 38 engages the draft gear or cushioning mechanism and blocks 18 are not subjected to any buffing forces. In draft, however, blocks 18 transmit the pulling forces from the coupler to the yoke through projections 24 and surfaces 34.

Side walls 17 of the coupler shank contain horizontal key slots 40 for use when the shank is to be connected to an A. A. R. standard vertical plane yoke.

It is to be observed that the portion of the shank within the yoke hood is of a maximum width at about point A to compensate for the weakening of the section by recesses 20. As may be seen in Figs. 1 and 2, a shroud 39 connects side walls 17 and forms continuations of horizontal key slots 40. Shroud 39 has been joined to top and bottom walls 15 as at 41 to increase the strength of the shank in the region of slots 20. The actual strength of this portion of the shank is slightly greater than that of the A. A. R. standard E coupler rigid shank shown in Fig. 9.

Figure 1:
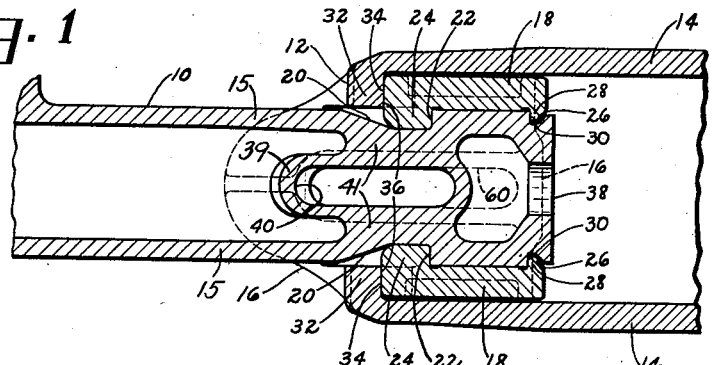
Fig. 1 is a longitudinal vertical sectional view of a coupler shank and yoke connection embodying my invention.
Figure 2:
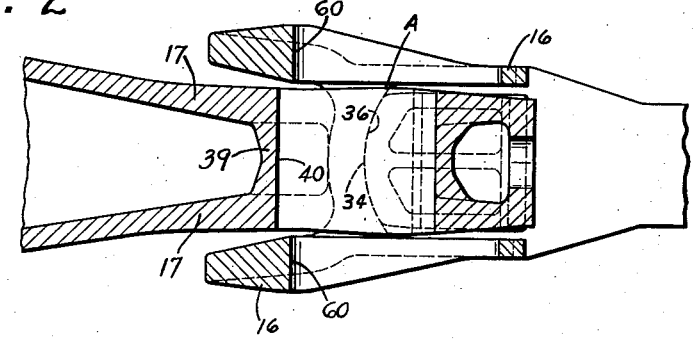
Fig. 2 is a longitudinal horizontal sectional view of a coupler shank and yoke connection embodying my invention.
Figure 3:
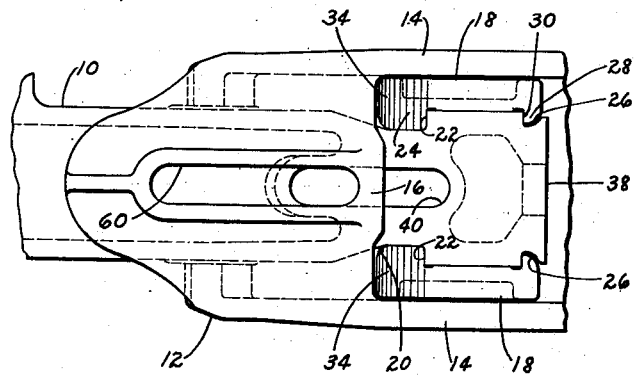
Fig. 3 is a side elevational view of the connection shown in Figs. 1 and 2 showing the coupler moved inwardly of the yoke to enable application of the retainer blocks.
Figure 4:
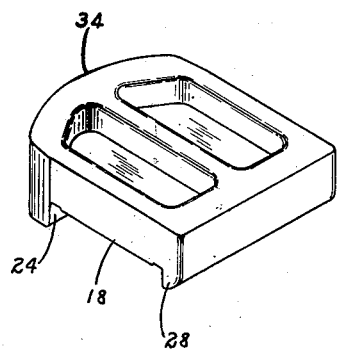
Fig. 4 is a perspective view of a retainer block.

The assembly of the connection is very simply effected by moving the coupler shank rearwardly into the yoke to a position in which the recesses 20 in the shank are rearward of side walls 16 of the yoke, as shown in Fig. 3. In this position of the parts blocks 18 may be readily moved transversely into proper position, after which the shank is moved forwardly until abutment surfaces 34 engage stops 32 in the yoke, thereby completing the assembly.

Figure 6:
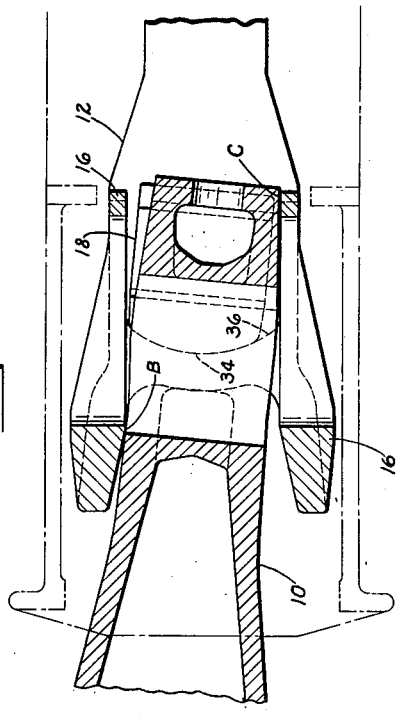
Fig. 6 is a view similar to Fig. 5 but showing the coupler shank angled a still greater amount.
Figure 5:
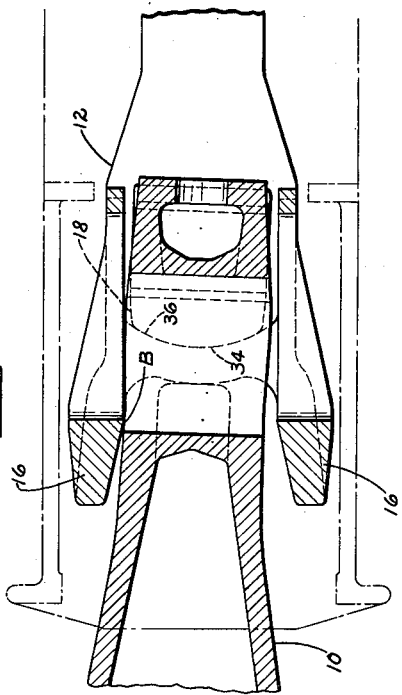
Fig. 5 is a longitudinal horizontal sectional view showing the coupler shank and yoke applied to a car, with the shank angled horizontally a predetermined amount.
Figure 7:
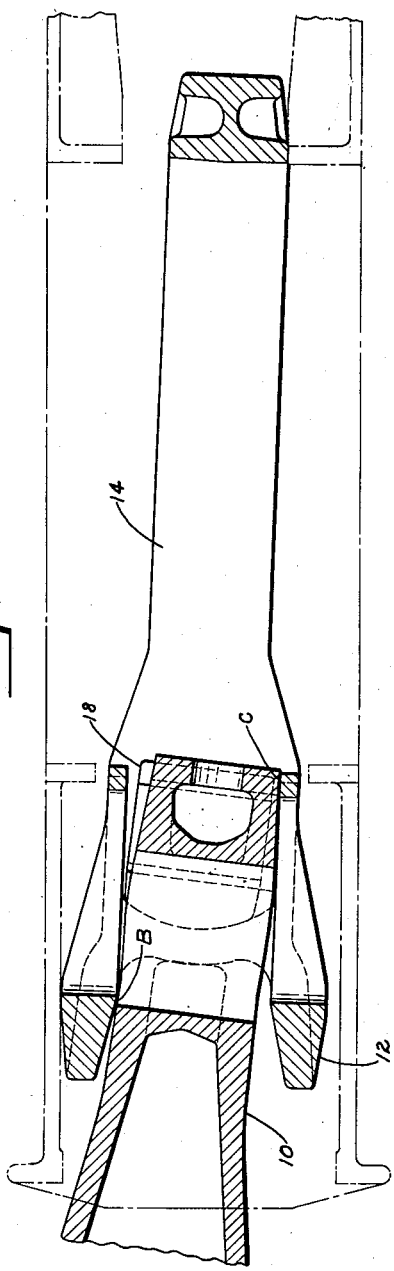
Fig. 7 is a view corresponding to Fig. 6 but showing the maximum horizontally angled position of the coupler shank and yoke.

In the Figs. 5, 6 and 7, in which the parts are in neutral position, are illustrated various angled positions of the coupler shank. During initial angling of the coupler rotational sliding occurs along arcuate surfaces 34 and 36, blocks 18 moving with the shank. This initial angling is limited, as seen in Fig. 5, by engagement of the shank with the adjacent side wall 16 as at B. Upon further angling of the coupler the shank heels about point B and, simultaneously, blocks 18 slide transversely of the shank and also rotate slightly along arcuate surfaces 34 and 36. This action continues until the end of the shank engages the opposite side wall 16 as at C, as seen in Fig. 6. Further angling of the coupler is effected through displacement of the yoke between the center sills of the car to the position shown in Fig. 7. The total amount of horizontal angling of the coupler thus provided equals the A. A. R. requirements.

A feature of the invention resides in the manner in which blocks 18 are anchored to shank 10 whereby the blocks angle with the shank during initial angling of the latter to the position shown in Fig. 5, but are thereafter permitted to displace transversely of the shank to allow the shank to angle the full extent of the clearance between the shank and the side walls 16 of the yoke. Thus while blocks 18 are positively secured to the shank for angling movement therewith, yet the blocks are free to be displaced transversely of the shank during a portion of the angling movement of the shank relative to the yoke.

In order to permit interchangeability of the coupler shank and yoke described herein with the corresponding A. A. R. standard parts it is necessary that all dimensional and strength specifications for the standard parts be met. Accordingly, the transverse spacing of side walls 16 of the yoke cannot be increased to allow for greater angling of the coupler. Likewise, the width of the shank within the hooded portion of the yoke cannot be decreased without sacrifice of strength. Therefore, the transverse spacing of yoke walls 16 is identical with that for the A. A. R. Y-40 yoke, while the width of the shank within the hooded portion of the yoke is at no point less than that of the standard shank.

In Fig. 8 shank 10 is shown applied to a standard Y-40 yoke which is indicated by numeral 50. When the shank is thus applied blocks 18 are of course not used and the shank is connected to the yoke by means of horizontal key 52 extending through slots 54 in the side walls of the yoke and slot 40 in the shank. The connection functions in the same manner as when the A. A. R. standard E coupler rigid shank is connected to a Y-40 yoke. In buff shank 10 moves rearwardly relative to yoke 50, carrying key 52 rearwardly in slot 54. In draft the coupler shank and yoke move forwardly together, key 52 transmitting the coupler pulling force to the yoke.

In Fig. 9 an A. A. R. standard E coupler rigid shank, designated by numeral 56, is shown applied to the yoke 12. Again blocks 18 are not used and the connection between the shank and yoke is by means of key 52' extending through slot 58 in the shank and slot 60 in the yoke. As with the connection shown in Fig. 8, shank 56 and yoke 12 function in the same manner as when the shank 56 is connected to the Y-40 yoke.

It is to be understood that shank 10 and yoke 12 may be connected together by means of a key extending through slot 40 in the shank and slot 60 in the yoke, without the use of blocks 18. This connection then functions the same as the connection between a standard E coupler rigid shank and a Y-40 yoke.

It will thus be seen that my invention provides a novel coupler shank and yoke connection which dispenses with the usual key or pin for connecting these parts. In addition, it provides a coupler shank and a yoke, either of which may be substituted for corresponding A. A. R. standard parts with identical functioning of the resulting connection.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a coupler shank and yoke connection a yoke having a hooded forward portion, a coupler shank extending into said hooded portion, said shank having an end portion with top and bottom surfaces in substantially the same planes as the top and bottom surfaces of the shank proper, said end portion having pairs of transversely extending recesses on the top and bottom sides thereof, a pair of blocks within said hooded portion and having portions received in said recesses to anchor said blocks relative to said shank in both directions lengthwise thereof, said blocks being slidable transversely of said shank, and stop means on said yoke overlapping the forward ends of said blocks for engagement therewith to limit forward movement thereof, the forward ends of said blocks and the contacting surfaces of said stops being arcuately curved to provide full bearing between said surfaces during horizontal angling of said coupler relative to said yoke.

2. In a coupler shank and yoke connection, a yoke comprising top and bottom straps joined at their forward portions by side walls, a coupler shank extending into said yoke between said top, bottom and side walls, the spacing of said side walls and the width of said shank being such as to allow a predetermined amount of horizontal angling of said shank relative to said yoke, and means for operatively connecting said shank to said yoke, said means comprising retaining members anchored to said shank in transverse grooves on the top and bottom sides of said shank for slidable movement transversely of the latter, stops on said yoke for limiting forward movement of said members, the engaging surfaces on said stops and members being arcuately curved so that full bearing exists between said surfaces during horizontal angling of said shank relative to said yoke, said members during initial horizontal angling of said shank being stationary relative to said shank until said shank engages the adjacent side wall of said yoke at a point forward of said arcuate surfaces, thereafter further angling of said shank taking place about said forward point of contact between said shank and yoke, said members during said further angling of said shank being adapted to slide transversely of the latter and also to rotate along the arcuately curved surfaces on said stops until the opposite side of said shank engages the adjacent side wall of said yoke at a point to the rear of said arcuate surfaces.

3. A coupler shank comprising an end portion having its top and bottom sides disposed in substantially the same planes as the top and bottom sides of the shank proper, said end portion having pairs of spaced recesses on the top and bottom sides thereof, said recesses extending transversely the width of said shank and providing vertical abutment surfaces, said recesses being adapted for receiving projections on associated retainer blocks for engagement with said abutment surfaces to anchor the blocks against forward and rearward movement lengthwise of said shank and to allow transverse movement of said blocks relative to said shank.

References Cited in the file of this patent

UNITED STATES PATENTS

| Number | Name | Date |
|---|---|---|
| 713,627 | Gallagher | Nov. 18, 1902 |
| 1,130,051 | Young et al. | Mar. 2, 1915 |
| 1,224,278 | Cook | May 1, 1917 |
| 1,286,598 | Johnson | Dec. 3, 1918 |
| 1,482,751 | Kinne | Feb. 5, 1924 |
| 1,869,035 | Wolfe | July 26, 1932 |